J. W. CRANE & R. L. GRAVES.
ARTIFICIAL MINNOW OR FISH.
APPLICATION FILED AUG. 3, 1911.
1,010,481.
Patented Dec. 5, 1911.
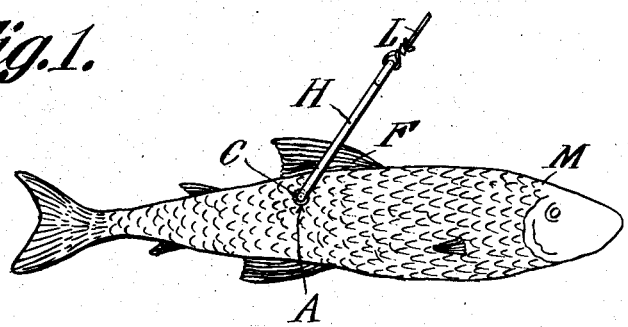
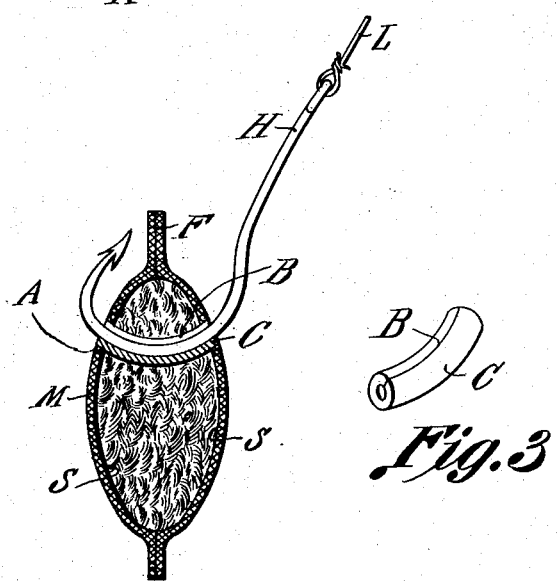
Joseph W. Crane and
Richmond L. Graves,
Inventor
Witnesses
by
Attorneys

UNITED STATES PATENT OFFICE.

JOSEPH WM. CRANE AND RICHMOND L. GRAVES, OF MEMPHIS, TENNESSEE.

ARTIFICIAL MINNOW OR FISH.

1,010,481.   Specification of Letters Patent.   Patented Dec. 5, 1911.

Application filed August 3, 1911. Serial No. 642,104.

*To all whom it may concern:*

Be it known that we, JOSEPH W. CRANE and RICHMOND L. GRAVES, citizens of the United States, residing at Memphis, in the county of Shelby, State of Tennessee, have invented a new and useful Artificial Minnow or Fish, of which the following is a specification.

This invention relates to artificial minnows or fish for use as a substitute for live fish for catching or snagging or in any other manner decoying and catching larger fish.

This invention has for its primary object to provide an artificial bait which will closely imitate the movement of a live minnow or fish when drawn through the water.

With the above and other objects in view the invention resides essentially in a fish or minnow shaped body having an arcuate tube passing through the body, above the center thereof and intermediate the head and tail of the body through which the fish hook may be inserted. The body is also highly colored to imitate the species of fish or minnow which it is desired to imitate, it being understood that various colorings may be employed to imitate various species of fish. The body of the fish or minnow is also prepared with a substance smelling strongly like fish, such as fish oil or the like. Thus a bait is formed which very closely imitates the real minnow or fish to deceive the unsuspecting larger fish which upon attempting to swallow same becomes ensnared with the hook which is inserted through the arcuate tube thus resulting in the same being caught and landed.

The invention is illustrated in the accompanying drawings, in which similar reference characters indicate similar parts and in which:—

Figure 1 is a side elevation of the artificial minnow as attached to a fish hook. Fig. 2 is a cross section thereof, taken through the hook receiving tube. Fig. 3 is a perspective of the hook receiving tube.

Referring specifically to the drawings, the body M of the minnow is formed of suitable cloth or rubber material, being preferably split lengthwise and centrally in a vertical plane into sections S which sections are cemented or otherwise secured together to form a hollow body which is stuffed with suitable material, or the body may be made solid. The outer surface of said body is highly colored to imitate the species of fish it is desired to use as a bait and the body is also prepared with a substance smelling strongly like fish such as fish oil or the like preferably by saturating the stuffing of the body.

An aperture A is arranged in each section at a point below the back fin F and an arcuate hook receiving tube T of rubber or other resilient material is mounted in said apertures and has a longitudinal split B therein extending from one extremity to the other extremity thereof. This tube therefore forms an arcuate opening through the body of the fish extending from side to side at a point below the back fin F and above the center of the body.

The hook H attached to the line L is hooked through the tube C, the prong thereof passing through the slit B, and as the line L is drawn forward when in use it causes a quivering movement of the body M as it passes through the water. The end of the hook H is curved to fit snugly within the tube C thus causing the body M to remain in position with respect to the hook but allowing a slight yielding movement of the body with respect thereto to form the wabbling or quivering motion of the body which closely imitates the movement of a live fish or minnow through the water. This tube C also prevents the motion of the hook with respect to the body or vice versa from damaging the body and therefore lengthens the life thereof.

An artificial minnow having the foregoing characteristics forms a good bait for fishing and is a close imitation to the real minnow and assists in the luring and decoying of the larger fish and rapid catching thereof which are attracted by the odor, appearance and movement thereof.

What is claimed is:—

1. An artificial minnow comprising a body, having an arcuate tube through the sides thereof adapted to snugly receive the curved end of a hook, whereby upon the minnow being drawn through the water a quivering movement is given thereto.

2. An artificial minnow comprising a body having an arcuate split resilient tube passing through the sides thereof, and a hook having the curved end thereof fitting snugly through the said tube, whereby upon the minnow being drawn through the water a quivering movement is given thereto.

In testimony that we claim the foregoing as our own, we have hereto affixed our signatures in the presence of two witnesses.

JOSEPH WM. CRANE.
RICHMOND L. GRAVES.

Witnesses:
PHIL M. CANALE,
JOHN D. MARTIN.